United States Patent
Anderson et al.

(10) Patent No.: US 6,233,016 B1
(45) Date of Patent: *May 15, 2001

(54) SYSTEM AND METHOD FOR MANAGING UTILIZATION OF A BATTERY

(75) Inventors: Eric C. Anderson, San Jose; Scott F. Fullam, Mountain View, both of CA (US)

(73) Assignee: Apple Computer, Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/328,862

(22) Filed: Jun. 9, 1999

Related U.S. Application Data (63) Continuation of application No. 08/633,105, filed on Apr. 16, 1996, now Pat. No. 5,963,255.

(51) Int. Cl.[7] .................................................. H04N 5/225
(52) U.S. Cl. ............................................................ 348/372
(58) Field of Search ..................................... 348/207, 372; 352/198; 362/3, 296; 358/909, 228; 455/89, 127, 343; 379/59, 61; H04N 5/225

(56) References Cited

U.S. PATENT DOCUMENTS

| | | | |
|---|---|---|---|
| 5,073,823 | * 12/1991 | Yamada et al. | 348/372 |
| 5,392,462 | * 2/1995 | Komaki | 455/89 |
| 5,633,573 | * 5/1997 | Duong et al. | 320/5 |

* cited by examiner

*Primary Examiner*—Tuan Ho
(74) *Attorney, Agent, or Firm*—Carr & Ferrell LLP

(57) ABSTRACT

A power supply provides a voltage to a digital camera. If the power supply voltage falls below a predetermined threshold, a voltage sensor generates a signal to a power manager. In response, the power manager configures the camera into a lower power consumption state. As the power source weakens further, the power manager continues to place the camera into a lower and lower power consumption state, until the power source is exhausted. The method of the present invention preferably comprises the steps of monitoring the power source's voltage, generating a signal if that voltage falls below a pre-determined threshold, and reducing the camera's power consumption in response to the signal.

24 Claims, 10 Drawing Sheets

SYSTEM AND METHOD FOR MANAGING UTILIZATION OF A BATTERY

CROSS-REFERENCE TO RELATED APPLICATIONS

This application is a continuation of co-pending U.S. patent application Ser. No. 08/633,105, filed on Apr. 16, 1996, U.S. Pat. No. 5,963,255 and relates to co-pending U.S. patent application Ser. No. 08/355,031, entitled *A System and Method For Generating a Contrast Overlay as a Focus Assist for An Imaging Device*, filed on Dec. 13, 1994, by inventor Eric C. Anderson. The subject matter of this application is hereby incorporated by reference. This application is commonly assigned to Apple Computer, Inc.

BACKGROUND OF THE INVENTION

1. Field of the Invention

The present invention relates generally to power supplies. In particular, it the present invention relates to systems and methods for managing the power supply in electronic devices, such as those found in digital cameras.

2. Description of the Related Art

In the recent past, camera technology has greatly advanced. Not only have features, such as flashes, automatic focus devices, and automatic aperture setting devices, been added to traditional cameras, but digital photography has also been introduced. Digital cameras typically use a Charge-Coupled Device (CCD) to record an image. The image is then transferred into a memory device. From the memory device, the image may be output on a monitor or printer.

Each of the camera sub-systems noted above require electrical power. Flash units and automatic focus and aperture motors all draw significant power. For digital cameras, electrical power is even more critical, since the CCD array depends on voltages to capture an image, and volatile memory devices must continually receive electrical power in order to store and retain the captured images. Should electrical power ever be unexpectedly lost, the digital camera would lose any images stored in the volatile memory. For this reason, a reliable power supply is a critical component of modern digital cameras. Generally, modern cameras use lithium ("Li") batteries or nickel-cadmium ("NiCad") batteries in their power supplies, since the voltage they provide remains generally constant as the battery is discharged. Their almost constant voltage output results from their low internal impedance. As a result, the voltage generated by a Li or NiCad battery tends to be very stable regardless of the current load placed on the battery up until the battery is almost completely drained.

Li and NiCad batteries, however, have many limitations, such as being more expensive than more common batteries, such as alkaline batteries, and not being readily available in all stores. For instance, where alkaline batteries are usually available in general merchandise stores, Li and NiCad batteries are typically available only from camera or electronics stores. Furthermore, NiCad batteries discharge even when not in use and may require up to 24 hours or more to re-charge. Such self-discharging creates a risk that any image data stored in a volatile memory may be unexpectedly lost during camera storage.

Many of the inconveniences associated with Li or NiCad batteries are overcome with alkaline batteries. For instance, alkaline batteries are not only much less expensive than Li or NiCad batteries, but also are available in most general merchandise stores. Unfortunately, alkaline batteries have one serious deficiency. When an alkaline battery is relatively new and fully charged, it has a low internal impedance. As the alkaline battery discharges or ages, the internal impedance of the battery increases. Thus, when a high current load is placed on the alkaline battery, the voltage across its terminals dramatically falls as a result of its increased internal impedance. When the current load is decreased, the voltage then returns to a higher and more normal value. The same behavior is observed in both Li and NiCad batteries, but to a much lesser degree than alkaline batteries due to the former's lower internal impedance.

Battery behavior evidencing a falling voltage when the battery is heavily loaded and a rising voltage when the battery load is subsequently reduced is called a "bounce effect." Chemical batteries demonstrate the bounce effect when their voltage dramatically drops upon experiencing a large current drain, such as when a flash unit is charging at full power. After the large current load is removed, the voltage across the chemical battery recovers just as dramatically. The voltage drop created by the bounce effect increases significantly as the chemical battery's internal impedance increases due to age or discharging. Thus, an older and weakened alkaline battery demonstrates a substantial voltage bounce.

The bounce effect's most damaging aspects result when, due to a momentary high current drain event, a battery can no longer produce a large enough voltage to operate the camera, resulting in the complete loss of any image data within the volatile memory. The onset of this problem may occur suddenly, such as when the alkaline battery continues to produce sufficient and decreasing voltages for a period of time until all at once the voltage falls below a minimum level required to operate the camera. This problem is particularly acute when large currents are needed, such as when several of the camera's electronic subsystems are simultaneously energized. For example, if the camera's flash unit is being charged while the focus and aperture motors are adjusting the lens, the substantial current drain on the alkaline battery could cause the camera's voltage to drop below its required minimum.

What is needed is a system and method for automatically compensating for the effects of power supply degradation in order to maximize the power supply's useable life. Such a system and method would optimize camera performance independent of the power supply's operating characteristics.

SUMMARY OF THE INVENTION

The present invention is a system and method for managing the power demands placed upon a battery within a digital camera so as to avoid a condition where the battery is unable to provide a sufficient voltage for the camera's minimal operating needs while maximizing the battery's useful life. The invention accomplishes this task by monitoring the battery's voltage and reconfiguring the camera into a series of lower power consumption states. The apparatus of the present invention preferably comprises a power source, a voltage sensor and a power manager within a digital camera. The power supply provides a voltage to the camera. If the power supply voltage falls below a predetermined threshold, the voltage sensor generates a signal to the power manager. In response, the power manager configures the camera into a lower power consumption state. As the power source weakens further, the above apparatus continues to place the camera into a lower and lower power consumption state, until the power source is exhausted.

The method of the present invention preferably comprises the steps of monitoring the power source's voltage, generating a signal if that voltage falls below a pre-determined threshold, and reducing the camera's power consumption in response to the signal.

DETAILED DESCRIPTION OF THE PREFERRED EMBODIMENT

While a system and method will now be described with reference to a digital camera, those skilled in the art will realize that the present invention can be incorporated into any electronic device that operates on power from a battery or a similarly self-contained power supply.

The present invention is particularly advantageous to those battery powered devices whose batteries display a pronounced voltage drop during high current load conditions. Alkaline batteries within a digital camera fall into this category. When alkaline batteries are fully charged, internal resistance of the battery is low and device performance can be maximized. However, as the alkaline batteries weaken, the camera is reconfigured to draw power at an incrementally lower rate which roughly parallels the rate at which the alkaline batteries are weakening. This approach significantly reduces the alkaline battery's "bounce," permitting the camera to continue operating even when the batteries are in a partially discharged state and thus extending the battery's useful life. For example, while a conventional battery operated digital camera might take one-hundred pictures before experiencing a power failure, a battery operated digital camera incorporating the teachings of the present invention could reasonably enable the camera to take over four-hundred pictures before the onset of a power failure. Thus, the present inventions effectively and significantly increases the useful life of the batteries.

Figure 1:
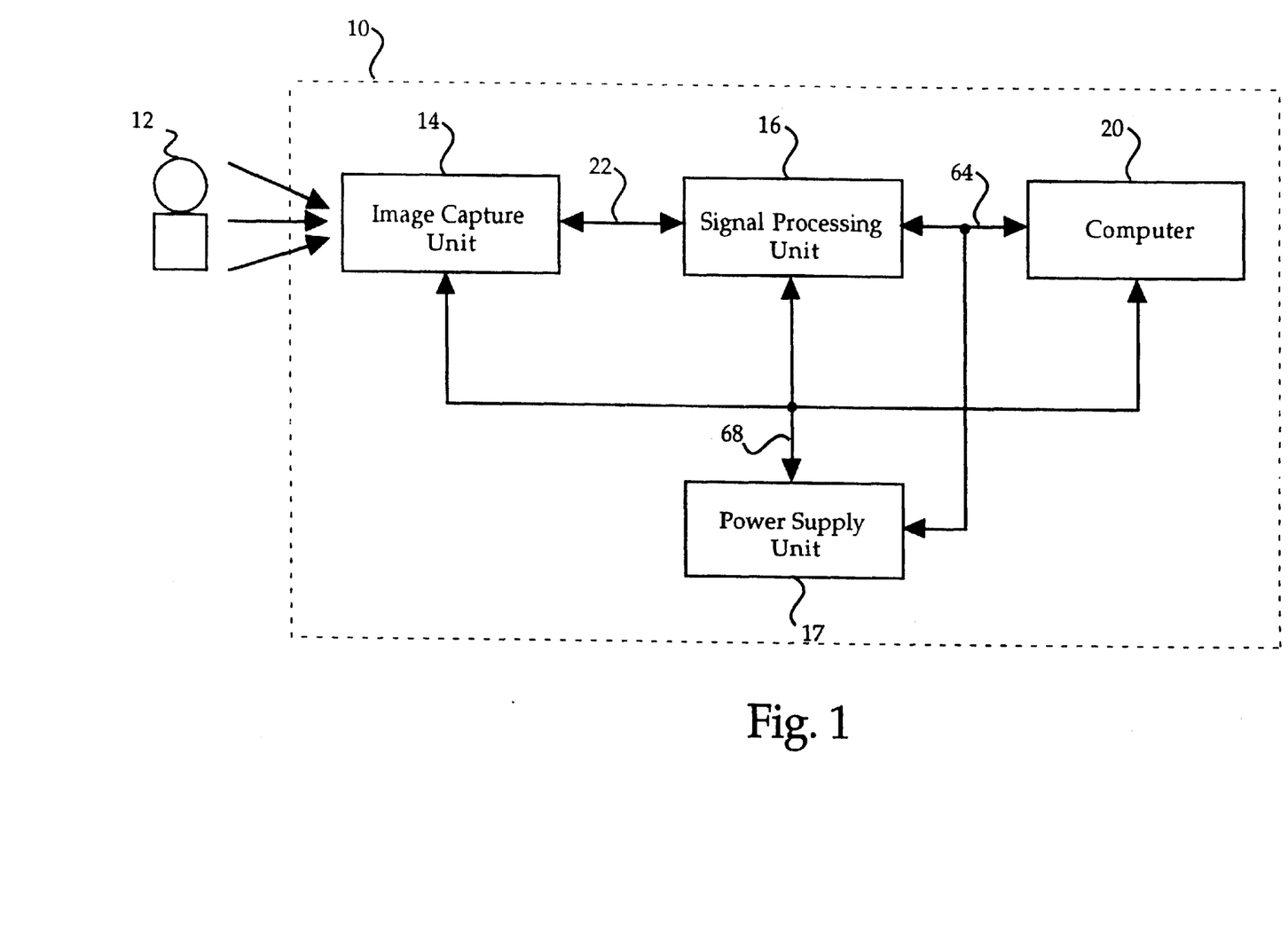
FIG. 1 is a block diagram of a camera constructed according to the present invention.

Referring now to FIG. 1, a block diagram illustrates a camera 10, constructed according to the present invention. The camera 10 is used to capture an image of an object 12, and preferably comprises an image capture unit 14 and a signal processing unit 16 coupled by an electronic interface 22, a computer 20 coupled to the signal processing unit 16 by a computer bus 64, and a power supply unit 17 providing power over a power bus 68 to the image capture unit 14, the signal processing unit 16 and the computer 20. The power supply unit 17 is also coupled via the computer bus 64 to the computer 20, as is discussed with reference to FIG. 3. An image is captured by the image capture unit 14 in response to a set of control signals passed on from the computer 20 by the signal processing unit 16. The image capture unit 14 transforms the captured image into a set of image data, as is discussed with reference to FIG. 2. The image data is passed over the electronic interface 22 to the signal processing unit 16. The signal processing unit 16 preferably comprises a Digital Signal Processor (DSP) and a buffer. The DSP is preferably implemented in hardware and is coupled to receive image data over the electronic interface 22. The DSP processes this image data in a conventionally known manner, such as by applying color correction and generating a variety of statistics (i.e. luminance, chrominance and focus) before passing the processed image data over the computer bus 64 to the computer 20. Those skilled in the art will recognize that alternatively the DSP could be implemented in software. The buffer acts as an interface between the electronic interface 22 and the computer bus 64 and preferably carries the set of control signals received from the computer 20. The computer 20 generates the set of control signals and receives the image data, as is discussed with reference to FIG. 4. If the signal processing unit 16 receives a signal processing unit shut-down signal on the power bus 68 from the computer 20, the signal processing unit 16 will shut down and no longer consume power.

Figure 2:
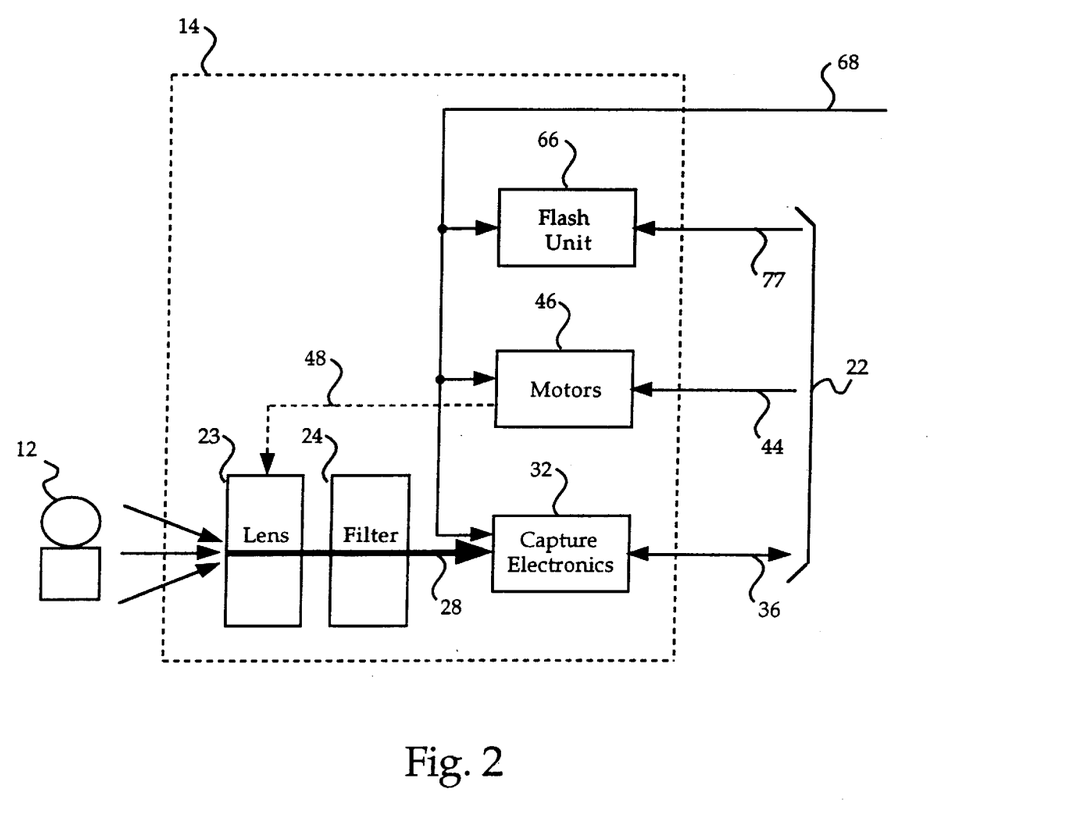
FIG. 2 is a block diagram of an image capture unit of the camera of FIG. 1.

Referring now to FIG. 2, the image capture unit 14 is shown in more detail. The image capture unit 14 preferably comprises a lens 23 having an iris, a filter 24, capture electronics 32, one or more motors 46 and a flash unit 66. U.S. patent application Ser. No. 08/355,031, entitled *A System and Method For Generating a Contrast Overlay as a Focus Assist For An Imaging Device*, filed on Dec. 13, 1994 is incorporated herein by reference and provides a detailed discussion of all of the preferred elements within the image capture unit 14, except for the flash unit 66. Briefly, light passes from the object 12 along an optical path 28 through the lens 23 and the filter 24 to the capture electronics 32. The lens 23, the filter 24 and the capture electronics 32 are preferably disposed in succession coaxially along the optical path 28. The lens 23 is preferably a zoom lens with variable focus; however, lens 23 could be any lens as will be understood to those skilled in the art. The filter 24 preferably includes an infrared filter and an ultraviolet filter such that only visible light is passed to the capture electronics 32, while wavelengths of infrared and ultraviolet light are absorbed. The filter 24 may also include optical low and high pass filters of various wavelengths of visible light as known to those skilled in the art. Additionally, the filter 24 preferably includes a "color filter array."

The capture electronics 32 are disposed in coaxial alignment with the optical path 28, and are positioned to receive filtered light containing image data from the filter 24. The capture electronics 32 preferably receive control signals on line 36 from the signal processing unit 16 for controlling the focus, exposure and color balance of the camera 10. These control signals include signals for setting the exposure time and the modes of the capture electronics 32 (i.e., flash sensor in preparation for image capture, expose image, shift image data array, etc.) and for interrupting image capture operations. The capture electronics 32 in turn generate image data sent to the signal processing unit 16 over line 36. Lastly, the capture electronics 32 are coupled to receive electrical power and control signals over power bus 68 from the power supply unit 17. If the capture electronics 32 receive a capture electronics shut-down signal on the power bus 68 from the computer 20, the capture electronics 32 will shut down and no longer consume power.

The motors 46 preferably control the lens' 23 focal length, focus, and aperture. Dashed line 48 represents the interaction between the components of lens 23 and motors 46. The motors 46 are coupled to receive electrical power and control signals over the power bus 68 and control signals from the signal processing unit 16 via line 44. In an exemplary embodiment, the motors 46 include a focus motor, an aperture motor and a zoom motor. The motors 46 are preferably of a conventional type known in the art. Those skilled in the art will realize that alternative embodiments of the present invention could incorporate motors with a plurality of speeds resulting in varying power consumption levels, selectable via control signals on power bus 68. If the motors 46 receive a motor shut-down signal on the power bus 68 from the computer 20, the motors 46 will shut down and no longer consume power.

The flash unit 66 is coupled to receive electrical power and control signals over the power bus 68. The flash unit 66 is also coupled to receive control signals from the signal processing unit 16 via line 77. The flash unit 66 generates a flash of light in response to a signal on line 77 to illuminate the object 12 during an image capture. The flash unit 66 may alternately act as a steady light source (i.e. a continuous source of light) for illuminating the object 12. The flash unit 66 preferably includes a capacitor for storing an electrical charge, a transformer for modifying the voltage of incoming electrical energy, and a controller. If the flash unit 66 receives a flash unit maximum power signal on the power bus 68, the flash unit 66 re-charges at its maximum power rate. If the flash unit 66 preferably receives a flash unit one-half maximum power signal on the power bus 68, the flash unit 66 preferably re-charges at. one-half of its maximum power rate. If the flash unit 66 receives a flash unit shut-down signal on the power bus 68, the flash unit 66 will shut down and no longer consume power.

Figure 3:
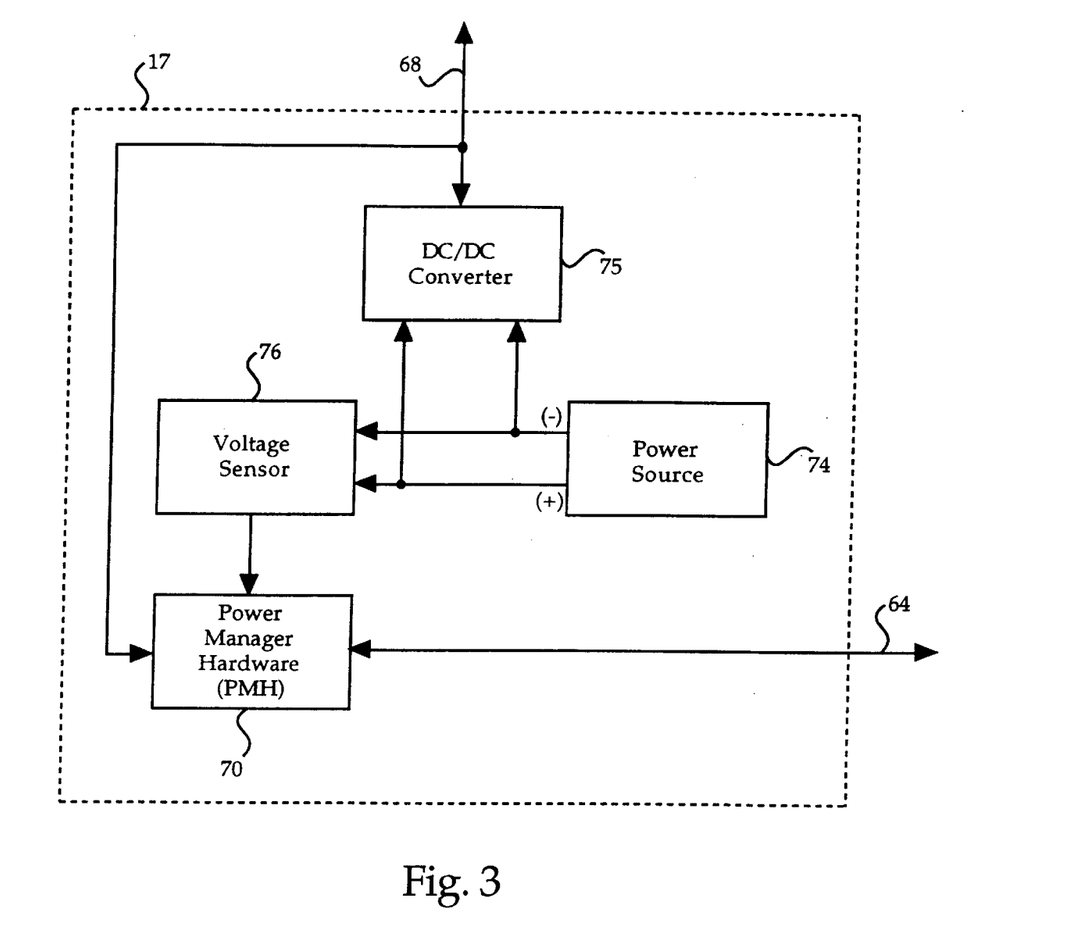
FIG. 3 is a block diagram of a power supply unit of the camera of FIG. 1.

Referring to FIG. 3, the preferred embodiment of the power supply unit 17 is now described. The power supply unit 17 preferably comprises power manager hardware (PMH) 70, a power source 74, a DC/DC converter 75, and a voltage sensor 76. The power source 74 is coupled to the DC/DC converter 75 to provide power for the electrical devices on the camera 10. The power source 74 has both a positive (+) and a negative (–) terminal coupled to the DC/DC converter 75 and the voltage sensor 76. The power source 74 generates a voltage between the positive and negative terminals. The power source 74 preferably comprises one or more alkaline batteries, but may alternately comprise one or more lithium batteries (Li), nickel cadmium (NiCad) batteries, or batteries of any other type.

The DC/DC converter 75 provides one or more regulated output voltages on the power bus 68 to all of the camera's 10 electronic components. In the preferred embodiment, the regulated output voltage is 5 volts +/–10%, which preferably remains within tolerance as long as the power source 74 voltage remains at or above approximately 5.0 volts. Those skilled in the art will recognize that these voltages are wholly dependent upon the camera's voltage requirements and the DC/DC converter's 75 conversion efficiency and electrical design. Furthermore, all of the specific voltages discussed throughout this specification are only exemplary of one preferred embodiment of the present invention. If the DC/DC converter 75 receives a DC/DC converter shut-down signal on the power bus 68 from the computer 20, the DC/DC converter 75 will shut down resulting in a complete camera 10 shut down.

The voltage sensor 76 is coupled to both the positive and negative terminals of the power source 74 for monitoring the power source's 74 voltage. The voltage sensor 76 (such as the MAX8213 or MAX8214 voltage monitors, produced by MAXIM Corp.; or the S-80752SN, S-80754SN or S-80764SN, produced by Seiko-Denshi Corp.) preferably monitors the power source's 74 voltage continuously. Upon detecting that the power source's 74 voltage has fallen below a predetermined threshold, the voltage sensor 76 generates and sends a signal to the PMH 70. The predetermined threshold is preferably 5.2 volts, which is 0.2 volts above the 5.0 volt minimum voltage that in the exemplary embodiment the power source 74 must maintain, for the reasons discussed above. Those skilled in the art will recognize that 0.2 volts is an arbitrary "safe-zone" which gives the PMH 70 and the computer 20 time to handle the signal. The "safe-zone" voltage may be larger or smaller than 0.2 volts depending on a conventional designer's "power-supply cost" verses "useful battery life" trade-offs. Typically, an energy storage device, such as a capacitor, is placed across the power source 74 to increase the maximum allowable response time from the computer 20 for a given "safe-zone" voltage. When the power source 74 voltage returns to a level above the predetermined threshold, the voltage sensor 76 ceases to generate the signal.

The PMH 70 is coupled to receive the signal from the voltage sensor 76, and is coupled to the computer 20 via the computer bus 64 to receive commands and transmit data and is coupled to the DC/DC converter 75 via the power bus 68 to transmit the flash unit and other units shut-down signal and receive the regulated output voltage. Upon receiving the signal from the voltage sensor 76 the PMH 70 immediately generates the flash unit shut-down signal, which commands the flash unit 66 to no longer consume any power as discussed above. Next, the PMH 70 generates an alert interrupt signal and sends it to the computer 20 via the computer bus 64. The computer's 20 operations in response to the alert interrupt signal are discussed with reference to FIG. 4. While all of the PMH's 70 operations are preferably effected within an Application Specific Integrated Circuit (ASIC), those skilled in the art will know that it could alternatively be performed by program instructions executed within the computer 20.

Figure 4:
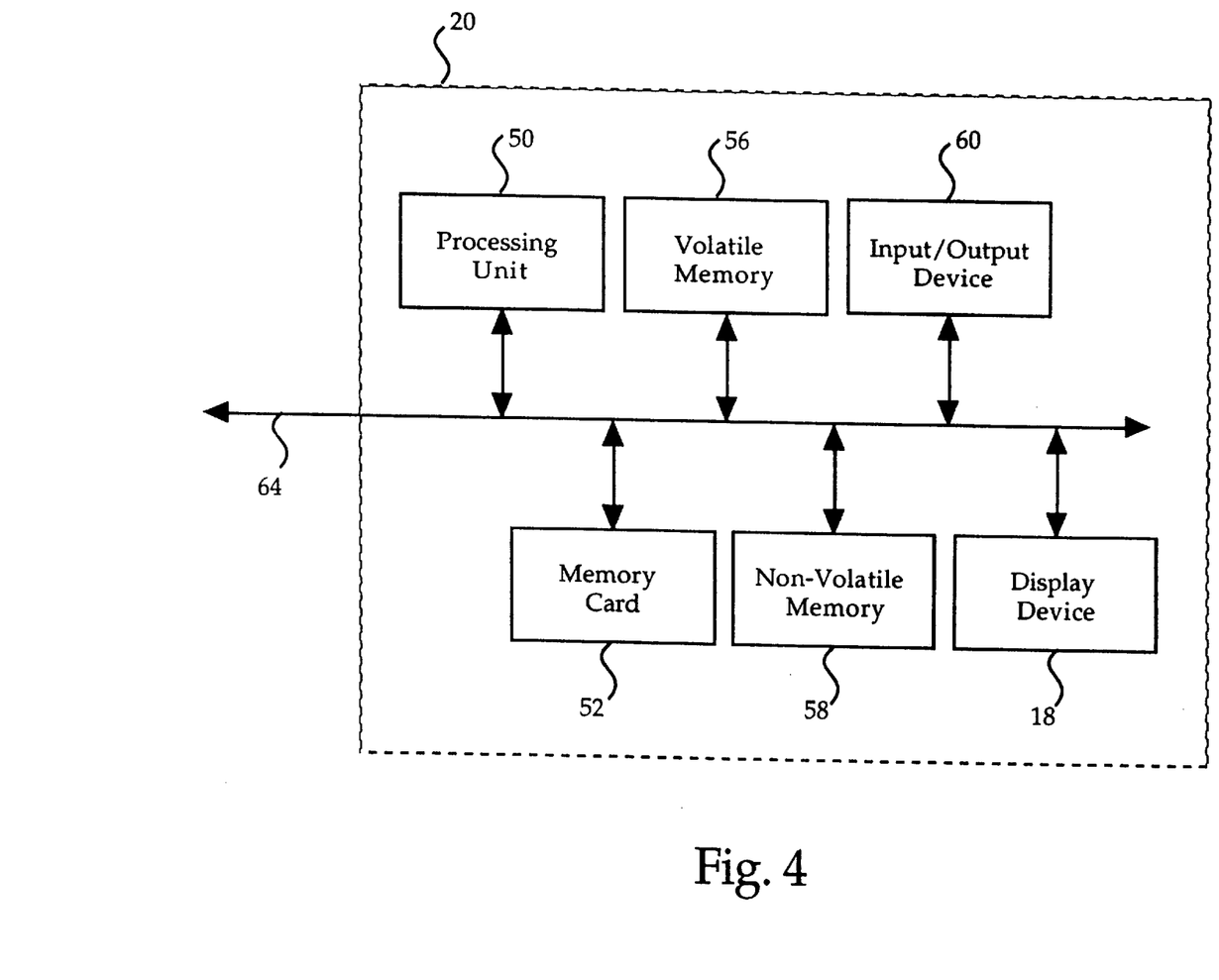
FIG. 4 is a block diagram of a computer of the camera of FIG. 1.

Referring now to FIG. 4, the computer 20 is shown in more detail. The computer 20 is preferably coupled by the computer bus 64 to the signal processing unit 16 and by the power bus 68 to the power supply unit 17 (FIG. 1). Explicit coupling of the power bus 68 to all the computer's 20 elements has been omitted for improved clarity in. FIG. 4. The computer 20 preferably comprises a processing unit 50, a memory card 52, a volatile memory 56, a non-volatile memory 58, an input/output device 60 and a display device 18, all coupled via the computer bus 64. In the preferred embodiment, the computer 20 is embedded as part of the camera 10. The processing unit 50 executes programming instructions to perform various camera operations. The processing unit 50 is preferably a microprocessor such as a Motorola Power PC821 embedded processor. The memory card 52 is preferably a non-volatile flash memory card for storing captured and processed image data. The volatile memory 56 contains memory locations suitable for storing program instructions or data and is preferably a Random Access Memory (RAM) device.

The non-volatile memory 58 stores a set of computer readable program instructions for controlling how the processing unit 50 accesses, transforms and outputs data, as described in detail below with reference to FIG. 5. While the non-volatile memory 58 is preferably a Read Only Memory (ROM), those skilled in the art will recognize that in alternate embodiments the non-volatile memory 58 could be replaced with a functionally equivalent computer useable medium such as: flash memory, a compact disk, a hard drive; a memory card; or a flash memory card.

The input/output device 60 is preferably comprised of a series of control buttons for controlling the camera's 10 operation and a status panel, such as an Liquid Crystal Display (LCD) panel, for displaying the camera's 10 operational status.

The display device 18 is preferably an active matrix, Color-LCD, which produces a live viewfinder image or a representation of a captured set of image data. Those skilled in the art will realize that the display device 18 could be any variety of other types of conventional display devices such as a flat panel display or a CRT or could be replaced by an optical viewfinder.

Figure 5:
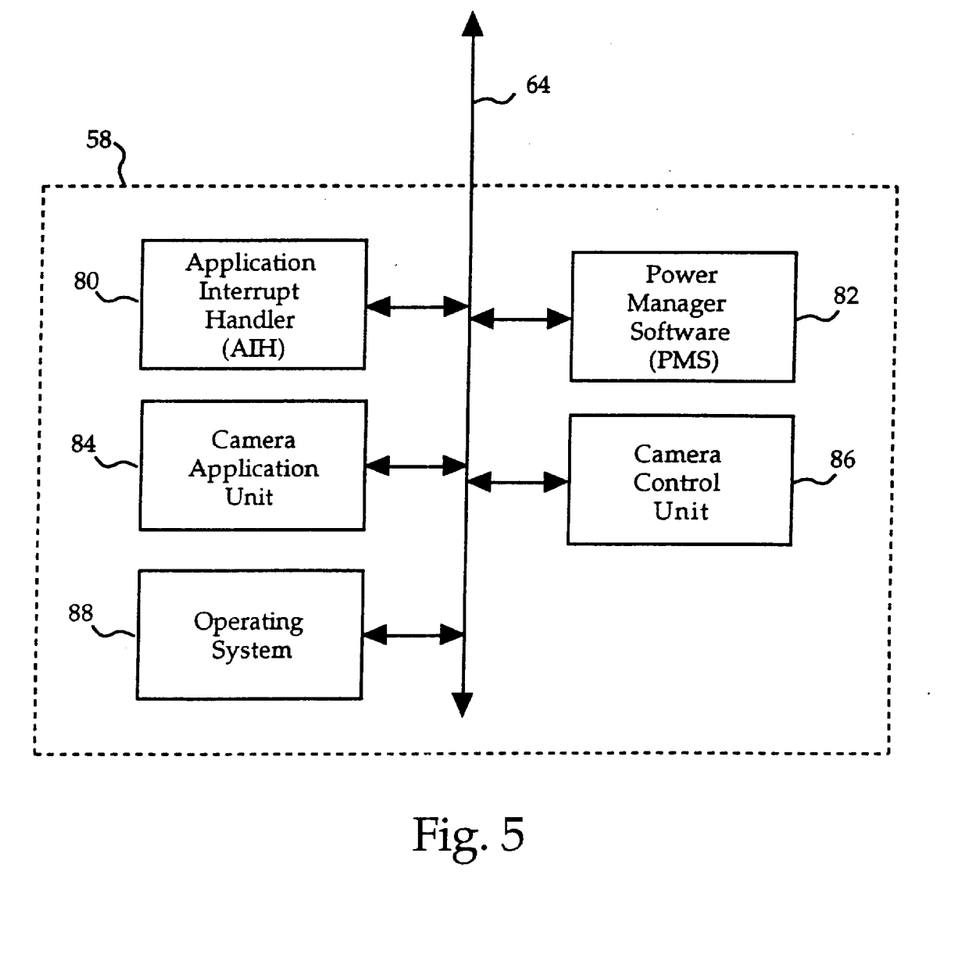
FIG. 5 is a block diagram of a non-volatile memory of the computer of FIG. 4.

Referring now to FIG. 5, a block diagram of the non-volatile memory 58 of the computer 20 of FIG. 4 is shown in more detail. The non-volatile memory 58 preferably comprises an application interrupt handler (AIH) 80, power manager software (PMS) 82, a camera application unit 84, a camera control unit 86 and an operating system 88, all coupled to the computer bus 64.

The AIH 80 is coupled to receive any signals passed on from the voltage sensor 76 by the PMH 70. Upon receiving an alert interrupt signal, the AIH 80 determines the interrupt's source, since many different interrupts may be generated within the camera 10. After identifying the PMH.70 as the source, the AIH 80 routes the alert interrupt signal to the PMS 82 for further processing as discussed below. Next the AIH 80 clears the alert interrupt signal by masking the appropriate register in the PMH 70 in which it was stored.

In the preferred embodiment, the PMS 82 has five power states: normal imaging power (Power State 5), low imaging power (Power State 4), restricted imaging power (Power State 3), normal processing power (Power State 2) and restricted processing power (Power State 1). In Power State 5 all of the camera's 10 functions are allowed to operate at full-power. In Power State 4 the flash unit 66 is configured so that it may only operate in a reduced-power charging mode. Alternatively, Power State 4 may also include other power reduction techniques. In Power State 3 the flash unit 66 is shut-down so as not to consume any power, however the camera 10 may still capture additional images. Alternatively, Power State 3 may also include additional power reduction techniques, such as running only one of the motors 46 at a time. In Power State 2 the image capture unit 14 and the signal processing unit 16 are shut-down, preventing the camera 10 from capturing any additional images, but permitting the computer 20 to complete any outstanding image processing functions. In Power State 1, if all processing is already completed then the computer 20 initiates the power down sequence, which completes by shutting-down the DC/DC converter 75. Otherwise, all display and I/O subsystems are shut down, and no additional sector read or write commands may be issued to the memory card 52. These restrictions effectively limit or stop processing in a reasonable state for continuing camera 10 operations when power is restored, including (hopefully) file operations halted on sector boundaries. Thus, the Power State 1 is a preparation for power failure. Note, while the threshold voltage is 5.2 V, "power failure" as it is used within this specification is defined within the PMS 82 to occur at any voltage between 5.0 V and 4.8 V. However, should the power source's 74 voltage fall below 4.8 V, the entire camera 10 will fail in a manner in which neither the PMS 82 nor the camera control unit 86 will have any control over. Conventional methods are used to relay voltage information to the PMS 82 so that it responds when the voltage falls between 5.0 V and 4.8 V.

All of the above Power States represent an upper limit on the amount of power that the camera 10 may consume. However, the Power States do not force the camera 10 to use power if such power is not required. For instance, even if the camera 10 is in Power State 5 and the flash unit 66 is allowed to operate, the flash unit 66 may still not operate if ambient lighting conditions are such that the flash unit 66 is not required during an image capture.

Figure 6:
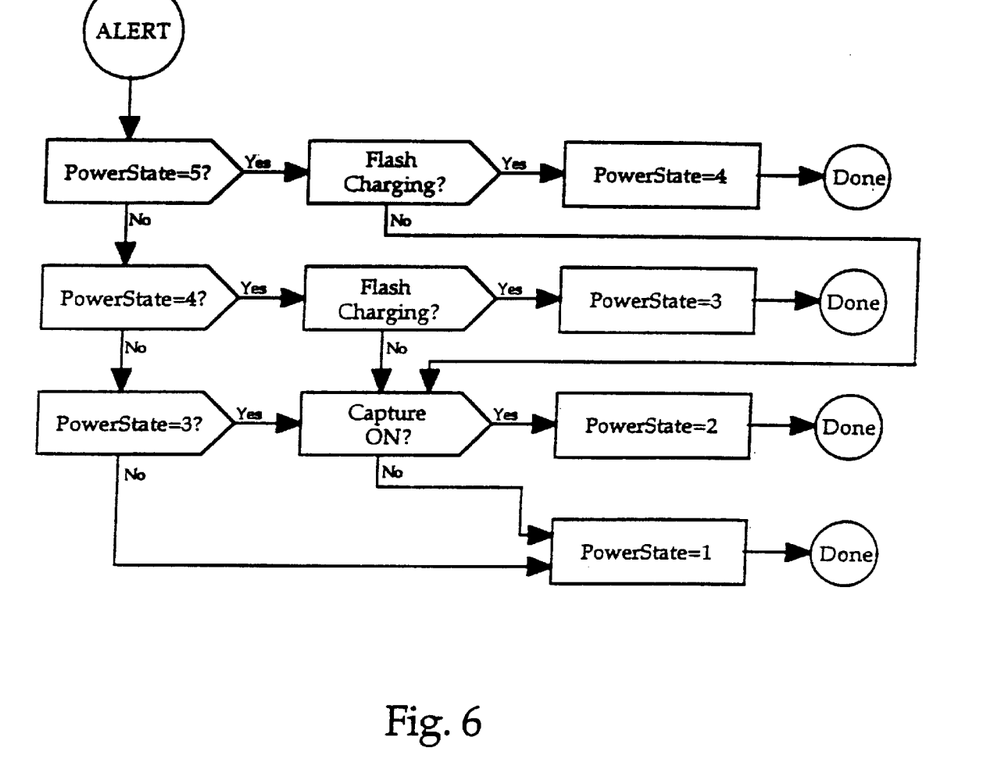
FIG. 6 is a state diagram of a method for managing power consumption of the camera of FIG. 1.
Figure 7A:
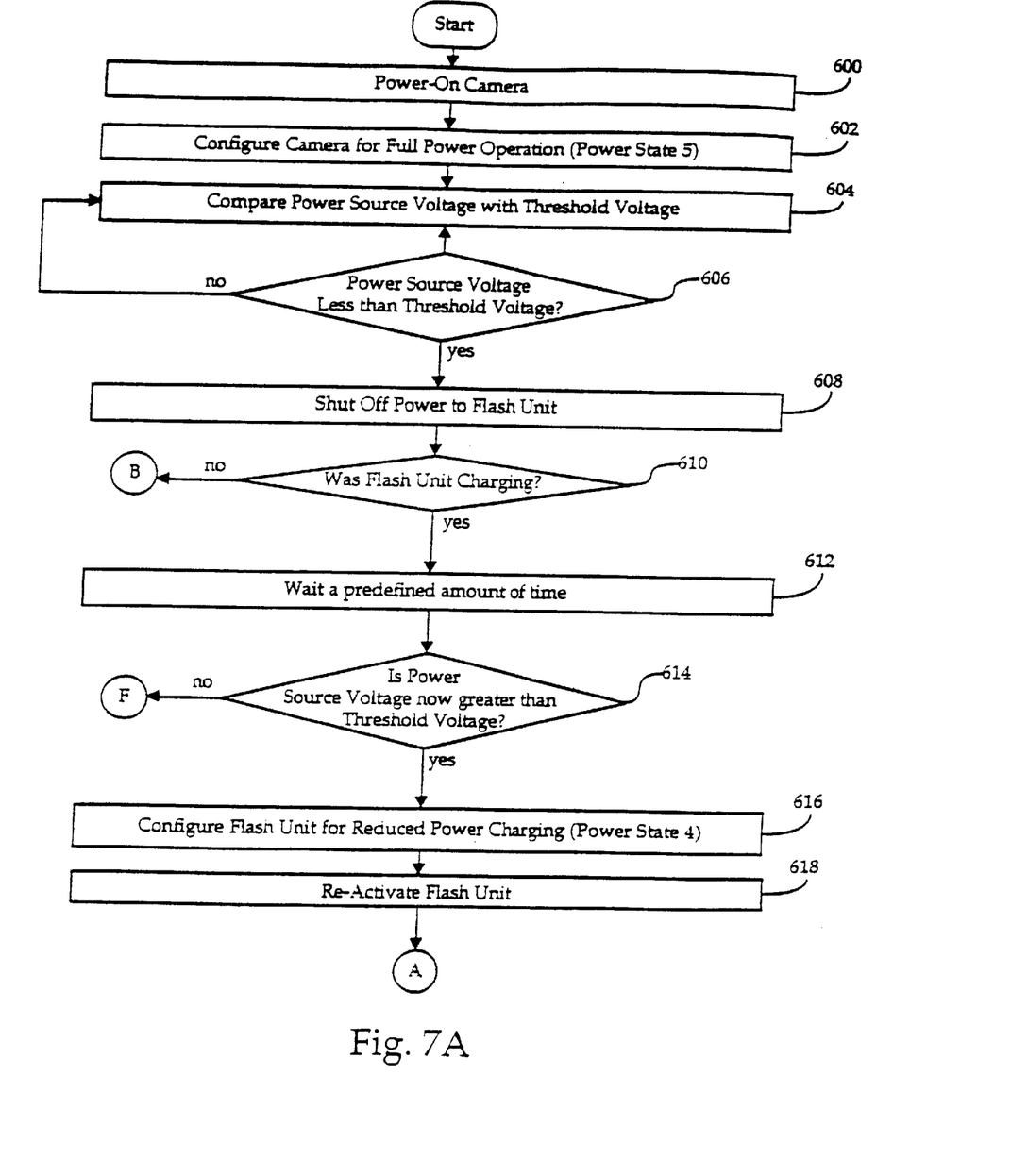
FIGS. 7A, 7B, 7C and 7D comprise a flowchart of a method for managing power consumption of the camera of FIG. 1.
Figure 7B:
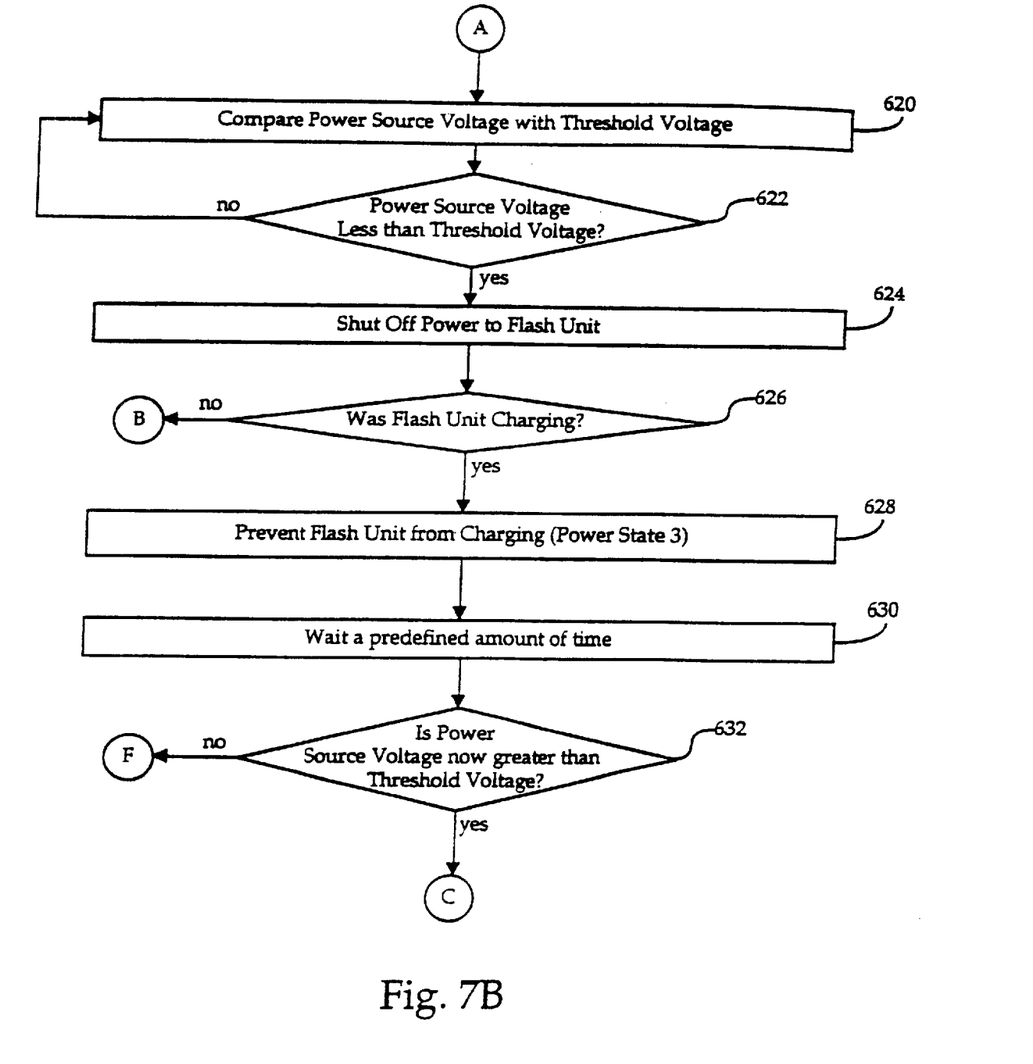
Figure 7C:
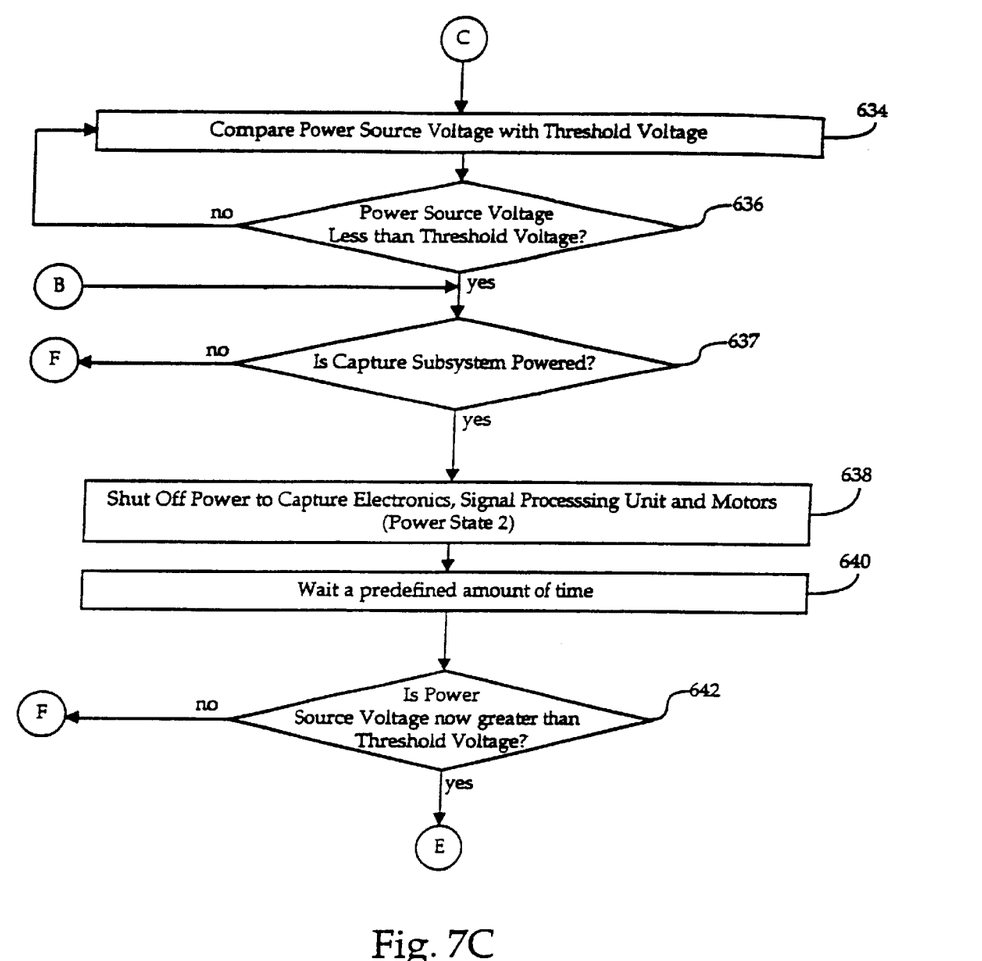
Figure 7D:
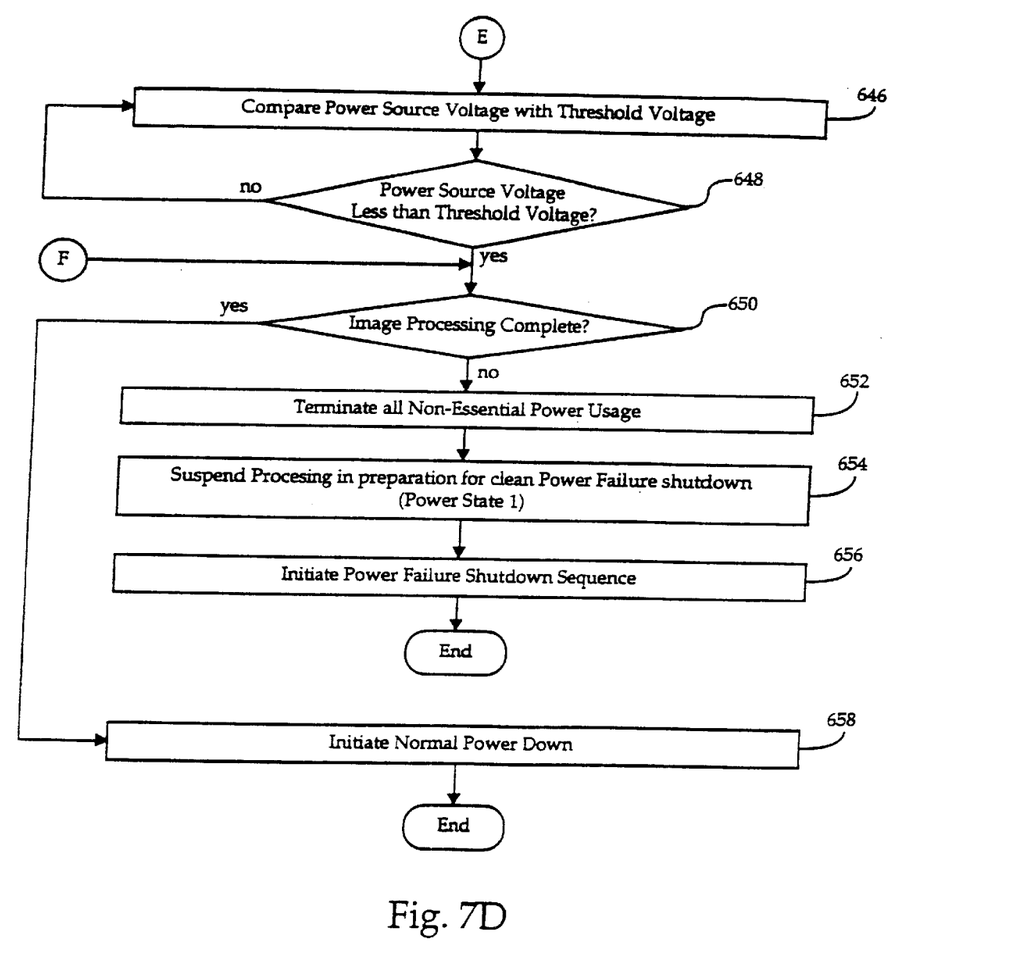

Referring now to FIG. 6, in conjunction with FIG. 5, a state diagram of a method for managing power consumption of the camera of FIG. 1 is shown. This state diagram illustrates the PMS's 82 state changes as the power source 74 slowly weakens, and is described as follows. The PMS 82 is coupled to receive the alert interrupt signal from the AIH 80, and in response output an alert signal to the camera application unit 84. If the PMS 82 is in Power State 5 and an alert interrupt signal is received, the PMS 82 determines if the flash unit 66 was charging (note: as discussed earlier the PMH 70 has already shut down the flash unit 66) by preferably monitoring a bit set in the PMH 70 or alternatively a variable set in the volatile memory 56 by the camera control unit 86. If the flash unit 66 was charging, the PMS 82 switches to Power State 4 and sends the alert signal (set to Power State 4) to the camera application unit 84. If the flash unit 66 was not charging, the PMS 82 determines if the image capture unit 14 is operating by preferably monitoring a bit set in the PMH 70 or alternatively a variable set in the volatile memory 56 by the camera control unit 86. If the image capture unit 14 is operating, the PMS 82 switches to Power State 2 and sends the alert signal (set to Power State 2) to the camera application unit 84. If the image capture unit 14 is not operating, the PMS 82 switches to Power State 1 and sends the alert signal (set to Power State 1) to the camera application unit 84. If the PMS 82 is in Power State 4 and an alert interrupt signal is received, the PMS 82 again determines if the flash unit 66 was charging. If the flash unit 66 was charging, the PMS 82 switches to Power State 3 and sends the alert signal (set to Power State 3) to the camera application unit 84. If the flash unit 66 was not charging, the PMS 82 determines if the image capture unit 14 is operating. If the image capture unit 14 is operating, the PMS 82 switches to Power State 2 and sends the alert signal (set to Power State 2) to the camera application unit 84. If the image capture unit 14 is not operating, the PMS 82 switches to Power State 1 and sends the alert signal (set to Power State 1) to the camera application unit 84. If the PMS 82 is in Power State 3 and an alert interrupt signal is received, the PMS 82 determines if the image capture unit 14 is operating. If the image capture unit 14 is operating, the PMS 82 switches to Power State 2 and sends the alert signal (set to Power State 2) to the camera application unit 84. If the image capture unit 14 is not operating, the PMS 82 switches to Power State 1 and sends the alert signal (set to Power State 1) to the camera application unit 84. If the PMS 82 is in Power State 2 and an alert interrupt signal is received, the PMS 82 switches to Power State 1 and send the alert signal (set to Power State 1) to the camera application unit 84. Preferably, Power States only transition downward into a lower Power State (i.e. from 5 to 4 to 3 to 2 to 1).

The camera application unit 84 is coupled to receive alert signals from the PMS 82, and in response outputs a power state change command to the camera control unit 86. If an alert signal set to power state 4 is received, the camera application unit 84 waits for the power source 74 voltage to recover for a predetermined amount of time, preferably 25 msec. This predetermined amount of time gives the power source 74 time to "bounce" back after various power draining devices within the camera 10 have been deactivated. If the PMH 70 has stopped generating the alert interrupt signal, the camera application unit 84 transmits a power state change command set to Power State 4 to the camera control unit 86 and commands the PMS 82 to clear the AIH's 80 mask. If the PMH 70 has not stopped generating the alert interrupt signal, the camera application unit 84 assumes that the power source 74 is not recovering and transmits a power state change command set to Power State 1 to the camera control unit 86. The camera application unit 84 prepares for power failure or shuts down the camera 10 as described earlier. If an alert signal set to Power State 3 is received, the camera application unit 84 immediately transmits a power state change command set to Power State 3 to the camera control unit 86. If an alert signal set to Power State 2 is received, the camera application unit 84 immediately transmits a power state change command set to Power State 2 to the camera control unit 86. The camera control unit shuts down all power to the image capture unit 14 and signal processing unit 16 when it receives this command. If an alert signal set to Power State 1 is received, the camera application unit 84 prepares for power failure or shuts down the camera 10 as described earlier. It is not necessary to send a signal to the camera control unit 86, since it is already shut down.

After a power state change command for state 3 or 2 is transmitted to the camera control unit 86, the camera application unit 84 waits for the predetermined amount of time for the PMH 70 to clear the alert signal. If the PMH 70 has stopped generating the alert interrupt signal, the camera application unit 84 commands the PMS unit 82 to clear the AIH's 80 mask. If the PMH 70 has not stopped generating the alert interrupt signal, the camera application unit 84 assumes that the power source 74 is not recovering and transmits the power state change command set to Power State 1 to the camera control unit 86. The camera application unit 84 prepares for power failure or shuts down the camera 10 as described earlier. After a power-up or a power-failure-restart (when an AC adapter is connected to the power source 74 or new batteries are installed), the camera application unit 84 always transmits a power state change command set to Power State 5 (the highest Power State) to the camera control unit 86. If the power source 74 happens to be weak, a quick series of alert signals from the PMS 82 will restore the camera 10 to its appropriate Power State. However, if the weak power source 74 has been replaced with a fully charged one, the camera 10 will remain in the highest Power State.

The camera control unit 86 is preferably coupled via the computer bus 64, the signal processing unit 16 and electronic interface 22 to control the image capture unit 14 (ref. FIG. 1). The camera control unit 86 also controls the power state of the image capture unit 14 and signal processing unit 16 by accessing the PMS 82. The buffer within the signal processing unit 16 passes control signals generated by the camera control unit 86 on to the flash unit 66 via line 77, to the motors 46 via line 44, and to the capture electronics 32 via line 36. For instance, the camera control unit 86 preferably generates signals for controlling the image capture unit's 14 focus, balance, exposure, and illumination via lines 36 and 44, and for controlling the flash unit's 66 discharge via line 77. The camera control unit 86 is also coupled to transmit the power control signals (e.g. the capture electronics shut-down signal, the motor shut-down signal, the signal processing unit shut-down signal and so on, as described above) over the power bus 68 by means of calls to the PMS 82. Upon receiving a power state change command set to Power State 5 from the camera application unit 84, the camera control unit 86 generates the flash unit maximum power signal. Upon receiving a power state change command set to Power State-4, the camera control unit 86 generates the flash unit one-half maximum power signal, and restarts the flash charging, which was automatically stopped by the PMH 70. Upon receiving a power state change command set to Power State 3, the camera control unit 86 accepts a forced no-flash state (the PMH 70 has already turned off the flash). This forced no-flash state will affect the capture process under low light conditions. Alternatively in response to Power State 3, the camera control unit 86 could also configure the motors 46 for sequential operation rather than simultaneous operation. Upon receiving a power state change command set to Power State 2, the camera control unit 86 immediately generates the motor shut-down signal, the capture electronics shut-down signal and the signal processing unit shut-down signal. As discussed above, the camera control unit 86 has the ability to shut-down a number of devices 32, 46, 66 within the camera 10 via PMS 82. Those skilled in the art will recognize that the camera 10 can alternately be designed to respond to any number of power control signals generated by the camera control unit 86. In this way the camera control unit 86 can be used to maximize the useful life of the power source 74 using various power management schema.

The operating system 88 preferably comprises a conventional set of program instructions for controlling the configuration and usage of the computer's 20 hardware and software resources. While all of the above elements contained within the non-volatile memory 58 are embodied as software programs, those skilled in the art recognize that alternate embodiments may arbitrarily apportion their functional tasks between both hardware and/or software resources. Likewise, software organization may take many other forms to implement the same function.

Referring now to FIGS. 7A, 7B, 7C and 7D, a flow chart of a preferred method for managing power consumption of the camera 10 according to the present invention is shown. The method begins in step 600 where the user powers-on the camera 10 by depressing a button on the input/output device 60 thereby generating a power-on signal. In step 602, the camera application unit 84 configures the camera 10 for full power operation (Power State 5), in the manner discussed above. Next, in step 604, the voltage sensor 76 compares the power source 74 voltage with a threshold voltage. The threshold voltage is preferably in the form of a voltage reference generated within the voltage sensor 76 itself and is preferably set to 5.2 volts. Those skilled in the art recognize that the voltage sensor 76 will necessarily have some hysteresis. In step 606, if the power source 74 voltage is less than the threshold voltage, the method continues on to step 608, else, the method returns to step 604. In step 608 the PMH 70 immediately shuts off power to the flash unit 66. In step 610, if the PMS 82 determine that the flash unit 66 was charging at the time of the test in step 606 the method proceeds to step 612, else, the method proceeds to step 637. In step 612, the camera application unit 84 waits a predefined amount of time for the power source's 74 voltage to increase since the flash unit 66 is no longer consuming power. In step 614, if the camera application unit 84 determines that the power source 74 voltage has not risen above the threshold voltage, the method proceeds to step 650, else, the method proceeds to step 616. In step 616, the camera control unit 86 configures the camera 10 for reduced power charging of the flash unit 66 (Power State 4), in the manner discussed above. In step 618, the camera control unit 86 re-activates the flash unit 66. Next, in step 620, the voltage sensor 76 compares the power source 74 voltage with a threshold voltage. In step 622, if the power source 74 voltage is less than the threshold voltage, the method continues on to step 624, else, the method returns to step 620. In step 624 the PMH 70 immediately shuts off power to the flash unit 66. In step 626, if the PMS 82 determine that the flash unit 66 was charging at the time of the test in step 622 the method proceeds to step 628, else, the method proceeds to step 637. In step 628, the camera control unit 86 prevents the flash unit 66 from charging (Power State 3), in the manner discussed above. In step 630, the camera application unit 84 waits a predefined amount of time for the power source's 74 voltage to increase since the flash unit 66 is no longer consuming power. In step 632, if the camera application unit 84 determines that the power source 74 voltage has not risen above the threshold voltage, the method proceeds to step 650, else, the method proceeds to step 634. Steps 634 and 636 are performed by the preferred method in the same manner as steps 604 and 606. In step 637, if the PMS 82 determines that the capture subsystem (comprising the capture electronics 32, the signal processing unit 16 and the motors 46) are powered, the method proceeds to step 638, else, the method proceeds to step 650. Next, in step 638, the camera control unit 86 shuts off power to the capture electronics 32, the signal processing unit 16 and the motors 46 (Power State 2), in the manner discussed above. In step 640, the camera application unit 84 waits a predefined amount of time for the power source's 74 voltage to increase since the capture subsystem is no longer consuming power. In step 642, if the camera application unit 84 determines that the power source 74 voltage has not risen above the threshold voltage, the method proceeds to step 650, else, the method proceeds to step 646. Steps 646 and 648 are performed by the preferred method in the same manner as steps 604 and 606. In step 650, if the camera application unit 84 determines that image processing was not complete at the time of the test in step 648, the method proceeds to step 652, else, the method proceeds to step 658. In step 652, all non-essential power usage is terminated, by turning off the image capture unit 14 the signal processing unit 16, the display device 18, and input/output devices 60. In step 654, the camera application unit 84 suspends image processing in preparation for a dean power failure shutdown (Power State 1), in the manner discussed above. In step 656, the camera application unit 84 initiates a power failure shutdown sequence, in a conventional manner. After step 656 the preferred method ends. In step 658, the camera application unit 84 initiates a normal power down, in a conventional manner. After step 658 the preferred method ends.

Through the Power State shifting described above the camera 10 is able to maximize the useful life of the power source 74, independent of the power source's 74 discharge characteristics. Thus, while a power source 74 comprising alkaline batteries may cause the camera 10. to move to lower power states sooner than if Li or NiCad batteries were used, the camera 10 still shifts between the same set of Power States in the same manner, thus the user is not penalized for the type of batteries used and need not set any indicator designating the type of batteries powering the camera 10.

While the present invention has been described with reference to certain preferred embodiments, those skilled in the art will recognize that various modifications may be provided. These and other variations upon and modifications to the preferred embodiment are provided for by the present invention which is limited only by the following claims.

What is claimed is:

1. A system for managing utilization of a power source within a camera having a plurality of power states each consuming a certain amount of power, comprising:
    a voltage sensor, responsive to at least one among a plurality of predetermined voltage levels of the power source, each of said levels corresponding to one of said power states, for generating an alert signal; and
    a power manager coupled to the voltage sensor, responsive to said alert signal, for placing the camera into one of said power states.

2. The system of claim 1 wherein:
    a first one of said power states configures the camera for full power operation; and
    a second one of said power states configures the camera for reduced power operation.

3. The system of claim 1 wherein the voltage sensor continuously monitors the power source.

4. The system of claim 1 wherein said power states take account of power consumed by a flash unit.

5. The system of claim 1 further comprising:
    an application unit for receiving the alert signal and waiting a predetermined amount of time before preparing for placing the camera in one of said power states; and
    wherein the power manager is responsive to the alert signal via the application unit.

6. A system for managing utilization of a power source within a camera having a plurality of power states each consuming a certain amount of power, comprising:
    a voltage sensor, responsive to at least one among a plurality of predetermined voltage levels of the power source, each of said levels corresponding to one of said power states, for generating an alert signal; and
    a power manager coupled to the voltage sensor, responsive to said alert signal, for placing the camera into one of said power states;
    wherein
        a first one of said power states configures the camera for full power operation;
        a second one of said power states configures the camera for reduced power operation;
        the power manager places the camera into a third one of said power states in response to said alert signal; and
        the third power state configures the camera to consume less power than does the second power state.

7. A method for managing utilization of a power source within a camera having a plurality of power consumption states corresponding to a plurality of voltage levels of the power source, comprising the steps of:
    detecting a voltage level among said plurality of voltage levels; and
    allowing the camera to operate in a power consumption state corresponding to the detected voltage level.

8. The method of claim 7 further comprising the step of continuously monitoring the power source.

9. The method of claim 7 wherein said power consumption states take account of power consumed by a flash unit.

10. The method of claim 7 wherein the camera when in each state of the plurality of power consumption states consumes a certain amount of power.

11. A method for managing utilization of a power source within a camera having a plurality of power consumption states corresponding to a plurality of voltage levels of the power source, comprising the steps of:
    detecting a voltage level among said plurality of voltage levels;
    allowing the camera to operate in a power consumption state corresponding to the detected voltage level;
    waiting a predefined amount of time after performing the allowing step; and
    if the voltage level of the power source has not risen above a threshold voltage level then shutting down the camera.

12. The method of claim 11 further comprising the step of initializing the camera into a high-level power state; wherein the step of allowing includes the steps of:
    configuring the camera into a mid-level power state if the voltage level of the power source falls below the threshold voltage level; and
    configuring the camera into a low-level power state if the voltage level of the power source falls below the threshold voltage level while the camera is in the mid-level power state.

13. An apparatus for managing utilization of a power source within a camera having a plurality of power consumption states corresponding to a plurality of voltage levels of the power source, comprising:

means for detecting a voltage level among said plurality of levels; and means for allowing the camera to operate in a power consumption state corresponding to the detected voltage level.

14. The apparatus of claim 13 further comprising means for continuously monitoring the power source.

15. The method of claim 13 wherein said power consumption states take account of power consumed by a flash unit.

16. The apparatus of claim 13 wherein the camera when in each state of the plurality of power consumption states consumes a certain amount of power.

17. An apparatus for managing utilization of a power source within a camera having a plurality of power consumption states corresponding to a plurality of voltage levels of the power source, comprising:

means for detecting a voltage level among said plurality of levels;

means for allowing the camera to operate in a power consumption state corresponding to the detected voltage level;

means for determining if the voltage level of the power source has fallen below a threshold voltage level, before enabling the means for allowing;

means for waiting a predefined amount of time, after enabling the means for allowing; and means for executing a power failure shut-down sequence, if the voltage level of the power source has not risen above the threshold voltage level.

18. The apparatus of claim 17 further comprising means for initializing the camera into a high-level power state; wherein the means for allowing includes:

means for configuring the camera into a mid-level power state if the voltage level of the power source falls below the threshold voltage level; and means for configuring the camera into a low-level power state if the voltage level of the power source falls below the threshold voltage level while the camera is in the mid-level power state.

19. A system for managing utilization of a power source within a camera having a plurality of power states each consuming a certain amount of power, comprising:

a voltage sensor, responsive to at least one among a plurality of predetermined voltage levels of the power source, each of said levels corresponding to one of said power states, for generating an alert signal; and a power manager coupled to the voltage sensor, responsive to said alert signal, for placing the camera into one of said power states;

wherein the plurality of power states includes
a first power state, a second power states and a third power state.

20. A method for managing utilization of a power source within a camera having a plurality of power consumption states corresponding to a plurality of voltage levels of the power source, comprising the steps of:

detecting a voltage level among said plurality of voltage levels; and allowing the camera to operate in a power consumption state corresponding to the detected voltage level;

wherein the plurality of power consumption states includes
a first power state, a second power state, and a third power state.

21. An apparatus for managing utilization of a power source within a camera having a plurality of power consumption states corresponding to a plurality of voltage levels of the power source, comprising:

means for detecting a voltage level among said plurality of levels; and means for allowing the camera to operate in a power consumption state corresponding to the detected voltage level;

wherein the plurality of power consumption states includes
a first power state, a second power state, and a third power state.

22. A system for managing utilization of a power source within a camera having a plurality of power states each consuming a certain amount of power, comprising:

a voltage sensor, responsive to at least one among a plurality of predetermined voltage levels of the power source, each of said levels corresponding to one of said power states, for generating an alert signal; and a power manager coupled to the voltage sensor, responsive to said alert signal, for placing the camera into one of said power states;

wherein:
the plurality of power states includes a full power state, a mid-level power state, and a low-level power state; and
in addition to the plurality of power states, the camera has an off state.

23. A method for managing utilization of a power source within a camera having a plurality of power consumption states corresponding to a plurality of voltage levels of the power source, comprising the steps of:

detecting a voltage level among said plurality of voltage levels; and allowing the camera to operate in a power consumption state corresponding to the detected voltage level;

wherein the plurality of power consumption states includes
a full power state, a mid-level power state, and a low-level power state;
wherein the camera has an off state in addition to the plurality of power states.

24. An apparatus for managing utilization of a power source within a camera having a plurality of power consumption states corresponding to a plurality of voltage levels of the power source, comprising:

means for detecting a voltage level among said plurality of voltage levels; and means for allowing the camera to operate in a power consumption state corresponding to the detected voltage level;

wherein:
the plurality of power consumption states includes a full-power state, a mid-level power state, and a low-level power state; and
in addition to the plurality of power states, the camera has an off state.

* * * * *